United States Patent [19]

Sano et al.

[11] 4,330,406
[45] * May 18, 1982

[54] SEMIPERMEABLE MEMBRANE AND PROCESS OF MAKING SAME

[75] Inventors: Takezo Sano, Takatsuki; Takatoshi Shimomura, Toyonaka; Masao Sasaki, Ibaragi, all of Japan

[73] Assignee: Sumitomo Chemical Company, Limited, Osaka, Japan

[*] Notice: The portion of the term of this patent subsequent to Nov. 16, 1993, has been disclaimed.

[21] Appl. No.: 70,692

[22] Filed: Aug. 27, 1979

Related U.S. Application Data

[60] Continuation of Ser. No. 667,342, Mar. 16, 1976, abandoned, which is a division of Ser. No. 503,701, Sep. 6, 1974, Pat. No. 3,992,495.

[30] Foreign Application Priority Data

Sep. 7, 1973 [JP] Japan ............................... 48/101417
May 23, 1974 [JP] Japan ................................ 49/58578

[51] Int. Cl.³ ............................................ B01D 31/00
[52] U.S. Cl. ...................................... 210/500.2; 264/22
[58] Field of Search ......... 210/500 M, 321 R, 433 M, 210/22 A, 22 B, 22 C, 23 F, 23 H, 23 R; 264/22, 41

[56] References Cited

U.S. PATENT DOCUMENTS 3,276,996 10/1966 Lazare .................................... 210/22
3,775,308 11/1973 Yasuda ......................... 210/500 M X
3,992,495 11/1976 Sano et al. ............................ 264/22

*Primary Examiner*—Frank A. Spear, Jr.
*Attorney, Agent, or Firm*—Stevens, Davis, Miller & Mosher

[57] ABSTRACT

Ultrathin membranes for separating substances are obtained by exposing shaped articles comprising a water-soluble polymer or a mixture of a water-soluble polymer and water-insoluble polymer to a plasma of a gas selected from helium, argon, nitrogen, hydrogen, oxygen, carbon monoxide, carbon dioxide, ammonia, a hydrocarbon having 1 to 10 carbon atoms, an epoxide having 2 to 10 carbon atoms, or an alkylamine, or a mixture of these substances to crosslink the surface layer, and then washing the exposed articles with water to remove the unreacted portions. The membrane exhibits outstanding performance characteristics when used in the processes for separating or concentrating substances, such as reverse osmosis, ultrafiltration, and the like.

11 Claims, 1 Drawing Figure

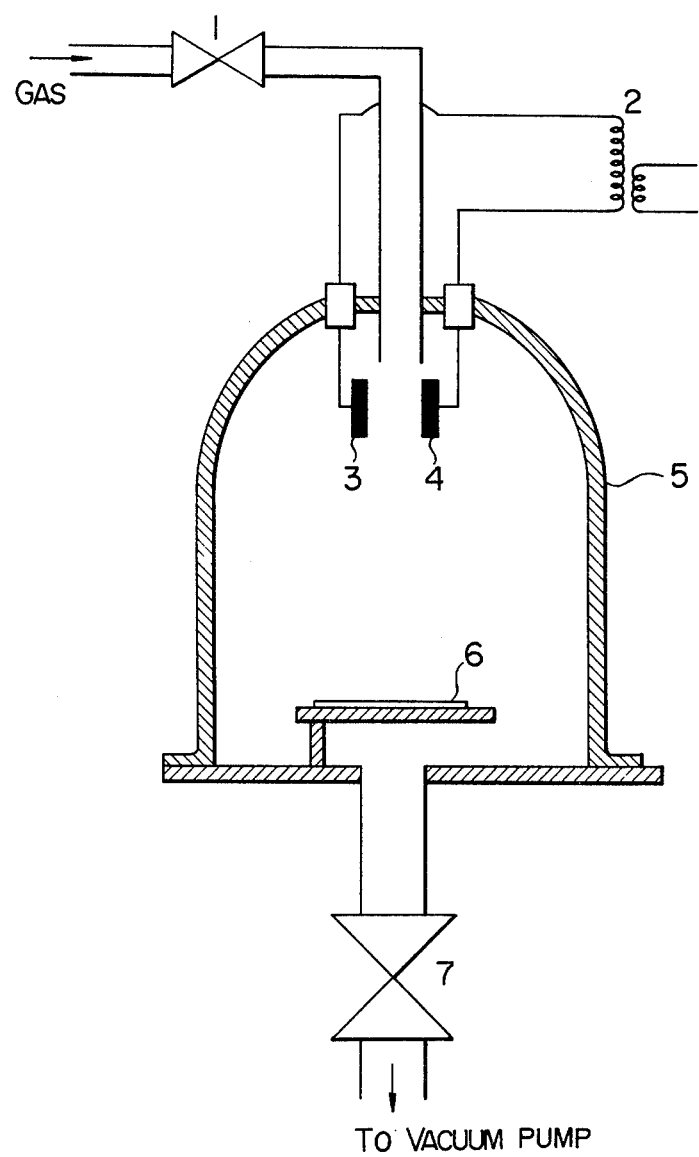
FIG.

SEMIPERMEABLE MEMBRANE AND PROCESS OF MAKING SAME

This is a continuation of application Ser. No. 667,342, filed Mar. 16, 1976, now abandoned, which in turn is a division of application Ser. No. 503,701, filed Sept. 6, 1974, now U.S. Pat. No. 3,992,495.

BACKGROUND OF THE INVENTION

This invention relates to a semipermeable membrane and a method for the manufacture thereof. More particularly, the invention relates to a semipermeable membrane obtained by crosslinking the surface layer of a shaped article of a water-soluble polymer by exposure to a plasma, and to a method for manufacturing said membrane. The semipermeable membrane thus obtained may be used in reverse osmosis, ultrafiltration, and various other processes for separating or concentrating substances.

BRIEF DESCRIPTION OF THE DRAWING

The accompanying drawing is a schematic diagram of a plasma irradiating apparatus for use in the method of this invention. In the drawing,
FIGS. 1 and 7 are valves,
FIG. 2 neon transformer,
FIGS. 3 and 4 electrodes,
FIG. 5 a vessel, and
FIG. 6 a sample.

DISCUSSION OF THE PRIOR ART

The semipermeable membrane currently being commercialized is a cellulose acetate membrane manufactured according to the method of Loeb and Sourirajan (U.S. Pat. Nos. 3,133,132 and 3,133,137) or a similar method. In spite of its good performances regarding the water flux and salt rejection, the cellulose acetate membrane has the disadvantages of a decline in the salt rejection with the lapse of time and of limited membrane life, owing to deterioration of the membrane caused by the inherent susceptibility of cellulose acetate to hydrolysis.

Further, the method of Loeb for preparing an asymmetric membrane having a skin structure requires a high-level technique to carry out. So far in only a few cases the method using cellulose acetate has proved to be successful in producing the semipermeable membrane. This is because it is difficult in this method to select proper casting solvent and additives, to estimate proper composition of the casting solution, and to optimize the atmosphere and temperature while evaporation of the solvent is in progress.

Accordingly, this method of membrane preparation is not generally applicable and is not always suitable for preparing a thin membrane.

Moreover, although water permeability of the cellulose acetate membrane prepared by the method of Loeb is comparatively high, yet it is hardly satisfactory from an industrial viewpoint. Consequently, several attempts have been reported to prepare a membrane having much higher water permeability.

For instance, a cellulose acetate membrane having a thickness of $1\mu$ or less has been prepared by casting, but as long as cellulose acetate is used as the membrane material, the disadvantage caused by susceptibility to hydrolysis cannot be neglected.

On the other hand, a large number of methods using a plasma have been known for the preparation of an ultrathin membrane from synthetic polymers. A reverse osmosis membrane has been obtained, for example, by polymerizing an organic monomer onto a suitable substrate [H. Yasuda et al., J. Appl. Polymer Sci., 17, 201–222 (1973)]. In this method, however, the membrane must be formed on a porous substrate having a mean pore diameter of $0.025\mu$ or less, which is necessitated by the process of its formation, and under a vacuum necessary for the generation of a glow discharge.

SUMMARY OF THE INVENTION

In order to overcome the aforesaid disadvantages in the methods for preparing an ultrathin membrane, the present inventors tried to prepare an ultrathin membrane by crosslinking only the surface layer of various polymers by exposure to a plasma. As the result, it was surprisingly found that a very thin and strong membrane, $1\mu$ or less in thickness, may be obtained by exposing a shaped article, e.g. film, from a water-soluble polymer to a plasma to crosslink the surface layer, and then removing the unreacted portions by dissolving in water. Moreover, it was also surprisingly found that when used in reverse osmosis, the said membrane is capable of manifesting sufficient ability to separate water and salt from each other, the separating performance being comparable to that of cellulose acetate.

OBJECTS OF THE INVENTION

An object of this invention is to provide a water-insoluble membrane having selective permeability to substances, which is prepared by crosslinking with a plasma only the surface layer of a shaped article from a water-soluble polymer and a method for manufacturing same.

Other objects and advantages of the invention will become apparent from the following description.

DETAILED DESCRIPTION OF THE INVENTION

According to the method of this invention, it is possible to manufacture a novel synthetic polymer membrane not susceptible to such deterioration due to hydrolysis or attack of bacteria that is the disadvantage of a conventional cellulose acetate membrane, and, hence, to provide an ultrathin membrane adaptable to separate or concentrate substances by reverse osmosis, ultrafiltration, or the like, with performance characteristics superior to those of a cellulose acetate membrane.

Among a variety of actual forms of the water-soluble polymer articles for use in the present method, particularly preferred are film, sheeting, filament, and a composite with other porous supports. These articles are made into membranes by exposure to a plasma and can be used as modules of suitable forms.

The most preferable embodiment of the present invention is in a supported membrane prepared by directly coating or impregnating a suitable porous support with an aqueous solution of a polymer to obtain a composite film, exposing the composite film to a plasma to crosslink only the surface layer, and then removing the uncrosslinked portions by washing with water. In this case, the porous support is not necessarily in sheet form but can be tubular or cylindrical. The composite membrane obtained with a porous sheet substrate is used as a flat or a spiral-wound module, and that obtained with a tubular porous substrate is used as a tubular module.

It is also possible to expose a film or a sheet obtained by casting a water-soluble polymer solution on a glass plate or the like to a plasma to crosslink only its surface layer. In this case, the exposed film is supported on a suitable support and then freed from the uncrosslinked portions by washing with water to form a membrane on the support. The membrane obtained in this case may also be used as a flat or spiral-wound module.

On the other hand, a hollow-fiber membrane is obtained by directly exposing a water-soluble polymer in the form of filament to a plasma to crosslink only the surface layer and then removing the inner portion remaining uncrosslinked by washing with water. More preferably, a filament used as a support is coated or impregnated with a water-soluble polymer and then exposed to a plasma to obtain a hollow-fiber membrane reinforced with a filament, which sufficiently endures a high pressure.

The gases to be used in this invention to generate the plasma include helium, argon, nitrogen, hydrogen, oxygen, carbon monoxide, carbon dioxide, ammonia, hydrocarbons having 1 to 10 carbon atoms such as, for example, methane, ethane, propane, ethylene, propylene, and acetylene; epoxides having 2 to 10 carbon atoms such as, for example, ethylene oxide, propylene oxide, and isobutylene oxide; alkylamines such as, for example, dimethylamine, and triethylamine; and mixtures of these substances.

As compared with other gases, when particularly hydrogen, helium, or ethylene oxide is used as the plasma-forming gas, a higher crosslinking rate results and a membrane having comparable performance characteristics is obtained in a shorter period of exposure to the plasma.

Although the precise chemical mechanism by which the plasma irradiation causes chemical reaction in the water-soluble polymer is still obscure, a crosslinked membrane retaining hydrophilic property of the starting polymer may be obtained by use of a plasma. A desirable result was obtained particularly when hydrogen, helium, or ethylene oxide had been used.

The plasma, as herein referred to, is that formed by a glow discharge, a corona discharge, or other means.

The plasma for use in this invention may be generated by various means. A plasma by glow discharge, for example, may be generated by introducing a plasma-forming gas through a valve 1 into a vacuum vessel 5 in the drawing so that the pressure in the vessel 5 may become 0.01 to 10 Torr., and applying across the electrodes 3 and 4 an alternating-current or direct-current voltage of 0.5 to 50 kV by means of a neon transformer 2. A plasma may be generated also by a corona discharge under a gas pressure of 1 atm and a direct-current of 0.1 A to 1.3 A at 1 kV, which is more convenient for the commerical manufacture of the membrane.

Since such a plasma penetrates through only a very small thickness of substances, it is most suitable for crosslinking only the surface layer of a water-soluble polymer film to yield a water-insoluble ultrathin membrane.

The polymers for use in this invention are water-soluble polymers and mixtures thereof with water-insoluble polymers.

The non-limitative examples of the water-soluble polymers include polyethylene oxide (including polyethylene glycol), polyvinylamine, polyacrylamide, polyacrylic acid, polyvinylpyrolidone, polyvinyl alcohol, polyethyleneimine, etc. Among these, polyethylene oxide, polyvinylamine, and polyacrylamine, in particular, yield desirable membranes.

The water-insoluble polymers for use in admixture with water-soluble polymers include polystyrene, polyethylene, natural rubber, polydimethylsiloxane, polyisobutene, polyvinyl acetate, cellulose acetate, etc. Of these, polystyrene, polyethylene, natural rubber, and dimethylsiloxane are particularly preferred.

By the addition of these water-insoluble polymers in a ratio of 0.1 to 0.3 part by weight to 1 part by weight of the water-soluble polymer, there is obtained a membrane stronger than the membrane from a water-soluble polymer alone.

The separation characteristics of the membrane obtained by the process of this invention are determined by controlling various factors such as, for example, the structure of the plasma generator, the duration of exposure, the exposure dose and the like. Among these factors, the duration of exposure to plasma and the exposure dose are important. By varying these two factors, it is possible to control the crosslinking degree and to obtain a membrane having desired separation characteristics. In general, the duration of exposure is from 5 min. to 120 min. and the exposure dose is from 5 watt to 100 watt.

When a polyethylene glycol film is exposed for 60 minutes or more to a plasma generated by use of, for example, the apparatus shown in the drawing under such conditions that the applied voltage is 1 kV and the hydrogen pressure is 0.1 Torr., there is obtained a membrane of high crosslinking density, which is used in reverse osmosis; whereas when the polyethylene glycol film is exposed for 30 minutes to the plasma formed under the same conditions, there is obtained a membrane of low crosslinking density, which is used desirably in ultrafiltration.

The exposure conditions depend upon the crosslinkability of the water-soluble polymer.

As stated above, one of the characteristic features of the present method for manufacturing a membrane consists in that a water-soluble polymer film is crosslinked only in the vicinity of its surface by taking advantage of a very small penetration depth of the plasma, and then the remaining uncrosslinked portions of the film are removed by washing with water, leaving behind a membrane. This method provides a novel technique for easily preparing a membrane having a thickness of $1\mu$ or less.

Another feature of the present method consists in that as compared with known methods, the supporting material may be selected from a wider range of substances, because a support having pores of larger diameter, e.g. $1\mu$, can be used.

A further feature of the present method consists in that since a water-insoluble membrane is prepared by simply exposing a water-soluble polymer in film or other forms to a plasma, a high-strength membrane may be manufactured under atmospheric pressure, as well as under vacuum, thus facilitating commercial production.

One of the features of the present membrane is its high water-permeability when used in reverse osmosis, owing to its thickness as small as $1\mu$ or less and to its high hydrophilicity because the membrane is composed of a crosslinked water-soluble polymer.

Another feature of the present membrane consists in that the starting material for the membrane can be a water-soluble synthetic polymer which is more resistant to hydrolysis and bacteria attack than the conventional cellulose acetate.

Consequently, the membrane of this invention may be widely used in separating or concentrating substances by reverse osmosis, ultrafiltration, etc.; more particularly, in desalination of sea water, waste-water treatment, concentration of fruit juices, etc. The present membrane has excellent steam permeability owing to its high hydrophilicity.

The invention is illustrated below in more detail with reference to Examples, but the invention is not limited to the Examples.

EXAMPLE 1

An aqueous solution containing 5% by weight of polyethylene glycol (molecular weight 20,000) was coated on a Millipore filter (VSWP, mean pore diameter 0.025μ, thickness 120μ), dried in the air at room temperature, and placed in a vacuum vessel as shown in the drawing. Ethylene oxide is introduced into the vessel and the valves 1 and 7 were adjusted so that the pressure of ethylene oxide in the vessel may be maintained at 0.1 Torr. An alternating-current voltage of 1.5 kV was applied by means of a neon transformer 2 across the electrodes 3 and 4 and the polyethylene glycol 6 on a support (Millipore filter) was exposed to the plasma for 60 minutes. The sample 6 thus obtained was mounted in a continuous reverse osmosis apparatus usually used in a laboratory and a reverse osmosis experiment was started. The uncrosslinked portions of the polyethylene glycol film began to dissolve and finally a water-insoluble crosslinked surface layer was left behind as a membrane on the Millipore filter. A pressure of 50 kg/cm$^2$ was applied for one hour under the conditions: concentration of salt in the feed solution, 0.55%; feed rate of the feed solution, 270 ml/min. The permeated water flux was 8.9 gfd (gallon/square foot/day) and the salt rejection was 99.2%. The salt rejection is defined by the following equation:

$$\text{Salt rejection (\%)} = \left(1 - \frac{\text{Concentration in normeate}}{\text{Concentration in feed solution}}\right) \times 100$$

EXAMPLE 2

Various membranes were prepared in the same manner as in Example 1, except that the plasma exposure conditions were varied. The results of reverse osmosis experiments carried out by using the membranes obtained above were shown in Table 1. The feed solution contained a mixture of 0.55% of salt and 0.5% of Methylene Blue (molecular weight 374).

TABLE 1

Experimental conditions: Applied pressure 50 kg/cm$^2$, feeding rate of feed solution 270 ml/min. The results shown were those obtained after the pressure had been applied for 2 hours.

| Duration of exposure (min.) | Water flux (gfd) | Salt rejection (%) | Methylene Blue rejection (%) |
|---|---|---|---|
| 20 | 172 | 65.9 | 95.8 |
| 40 | 40 | 85.0 | 99.7 |
| 60 | 21 | 92.2 | 100 |
| 80 | 6.2 | 99.0 | 100 |

EXAMPLE 3

An aqueous solution containing 10% by weight of polyacrylamide was coated on Micro-filter (pore diameter 0.6μ, thickness 90μ) made of polyvinyl chloride, dried in the air at room temperature, and exposed to a plasma under the same conditions as in Example 1. The data obtained in a reverse osmosis experiment by use of the membrane obtained above were as follows: applied pressure 50 kg/cm$^2$, concentration of saline water 0.55%, water flux 25 gfd, salt rejection 90%.

EXAMPLE 4

An aqueous solution containing 10% by weight of polyethylene oxide (molecular weight 250,000) was spread on a glass plate and dried in the air at room temperature to obtain a film, 22μ in thickness. The film was exposed to a plasma under the same conditions as in Example 1. The exposed film was laid over Toyo Membrane Filter (TM-2P, pore diameter 0.45μ, solvent resistant type) and mounted in a reverse osmosis apparatus. The data obtained in the reverse osmosis experiment were as follows: applied pressure 50 kg/cm$^2$, concentration of saline water 0.55%, water flux 8.5 gfd, salt rejection 99.0%.

EXAMPLE 5

A polyethylene glycol film (molecular weight 2,000) prepared in the same manner as in Example 1 was exposed for 30 minutes to a plasma generated under the following conditions: applied voltage 1.5 kV, hydrogen pressure 0.18 Torr. The data obtained on the exposed film in a reverse osmosis experiment were as follows: applied pressure 50 kg/cm$^2$, concentration of Acid Fuchsine in aqueous solution 0.5%, water flux 32.0 gfd, Acid Fuchsine rejection 99.9%.

EXAMPLE 6

A sheet of polyvinyl alcohol film, 30μ in thickness, was exposed to a plasma generated by a corona discharge obtained by use of the power source of a corona-discharge-type surface treating equipement (made by Lepel) under a power input of 500 W (0.85 A). The exposure was conducted in the air for 10 minutes. The exposed film was laid over a Microfilter made of polyvinyl chloride and mounted in a reverse osmosis apparatus. The data obtained in a reverse osmosis experiment were as follows: applied pressure 50 kg/cm$^2$, concentration of saline water 0.55%, water flux 15.3 gfd, salt rejection 95.4%.

What is claimed is:

1. A semipermeable membrane for separating substances prepared by
   exposing a shaped article of a water-soluble polymer or of a mixture of a water-soluble polymer and a water-insoluble polymer wherein the ratio of the water-soluble polymer to the water-insoluble polymer is 1 to 0.1–0.3 by weight to a plasma of a gas selected from the group consisting of helium, argon, nitrogen, hydrogen, oxygen, carbon monoxide, carbon dioxide, ammonia, a hydrocarbon having 1 to 10 carbon atoms, an epoxide having 2 to 10 carbon atoms, an alkylamine, or a mixture thereof to crosslink the surface layer of the shaped article, and then
   removing the uncrosslinked portions by washing with water.

2. The membrane of claim 1, wherein said water-soluble polymer is selected from the group consisting of polyethylene oxide, polyethylene glycol, polyvinylamine, polyacrylamide, polyacrylic acid, polyvinylpyrolidone, polyvinyl alcohol, and polyethyleneimine.

3. The membrane of claim 1, wherein said water-insoluble polymer is selected from the group consisting of polystyrene, polyethylene, natural rubber, polydimethylsiloxane, polyisobutene, polyvinyl acetate, and cellulose acetate.

4. The membrane of claim 1 having a thickness of no greater than 1μ.

5. The membrane of claim 1 adapted for use in separating or concentrating substances by reverse osmosis or ultrafiltration.

6. The membrane of claim 1, wherein the crosslinked product is in the form of film, sheet, filament, or a composite with other porous support.

7. A membrane for separating substances, consisting essentially of a surface plasma-crosslinked product of a mixture of a water-soluble polymer and a water-insoluble polymer, the ratio of the water-soluble polymer to the water-insoluble polymer being from 1 to 0.1 to 0.3 by weight.

8. The membrane of claim 7, wherein said water-soluble polymer is selected from the group consisting of polyethylene oxide, polyethylene glycol, polyvinylamine, polyacrylamide, polyacrylic acid, polyvinylpyrolidone, polyvinyl alcohol, and polyethyleneimine.

9. The membrane of claim 7, wherein said water-insoluble polymer is selected from the group consisting of polystyrene, polyethylene, natural rubber, polydimethylsiloxane, polyisobutene, polyvinyl acetate, and cellulose acetate.

10. The membrane of claim 7 having a thickness no greater than 1μ.

11. The membrane of claim 7, wherein the crosslinked product is in the form of a film, sheet, filament, or a composite with other porous support.

* * * * *